Figure 1:
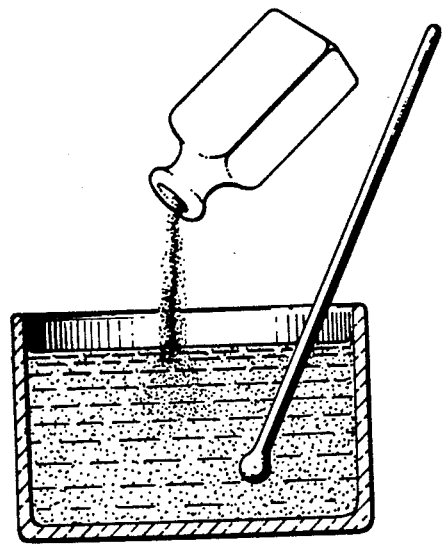

Dec. 3, 1963 R. L. MYERSON 3,113,111
DENTURE CLEANER CONTAINING A RINSE INDICATOR
Filed Sept. 3, 1959

INVENTOR.
RICHARD L. MYERSON
BY
Dike, Thompson & Bronstein
ATTORNEYS

United States Patent Office 3,113,111
Patented Dec. 3, 1963

3,113,111
DENTURE CLEANER CONTAINING A
RINSE INDICATOR
Richard L. Myerson, Newton, Mass., assignor to Myerson Tooth Corporation, Cambridge, Mass., a corporation of Massachusetts
Filed Sept. 3, 1959, Ser. No. 837,975
5 Claims. (Cl. 252—99)

The present invention relates to a dental cleaning composition for dental prosthesis. More particularly, it relates to an improved solid composition for making a dental cleaning solution of the type described in copending U.S. application Serial No. 816,402, filed May 28, 1959 by Richard L. Myerson and John C. Pirie.

The above-mentioned application describes a stable dental cleaning solution of a water soluble metal (alkali or alkaline earth metal or both) hypochlorite and an alkali metal salt of an acid having at least two ionizable hydrogen atoms and in which all valences of the acid are taken up with the alkali metal. The salt is present in the solution in an amount equal to at least about 3.0 mols per mol of available chlorine and sufficient to maintain the solution at a pH of at least about 11 over a range of dilutions between 1500 parts per million or more of available chlorine and about 750 parts per million of available chlorine, the acid of the salt being ineffective to reduce the hypochloride. Such a solution will remove heavy stains and calculus from dentures by immersion of the dentures therein, will not attack the metal in the dentures and is stable for long periods of time.

Where the hypochlorite is sodium hypochlorite and the salt is trisodium phosphate, such solutions may be made by adding water to solid chlorinated trisodium phosphate which may be made by spraying sodium hypochlorite solution on finely divided, anhydrous, solid trisodium phosphate to thereby produce a solid material as described in U.S. Patent No. 2,536,456, or by reacting NaOCl solution with a concentrated liquor of $Na_3PO_4$ and $Na_2HPO_4$ (such that the $Na_2O:P_2O_5$ ratio is 3:1) as described by Bell in an article "Hydrates of Trisodium Orthophosphate," Industrial and Engineering Chemistry 41, pp. 2901–2905, December 1949. Such material is commonly referred to as a chlorinated trisodium phosphate. It may be represented by the following formula: $4(Na_3PO_4 \cdot 11H_2O) \cdot NaOCl$. The particular manner in which it is made does not form a part of the present invention. In such case the solid chlorinated trisodium phosphate is manufactured, shipped and sold to the consumer and the consumer adds it to water in the proper quantities to form the cleaning solution. This reduces the cost of packaging and shipping and hence is desirable from a commercial point of view.

The dentures are soaked in the chlorinated trisodium phosphate solution for a time interval depending upon the strength of the solution and the amount of cleaning which is desired, which of course depends upon how bad the stains are and how much of the stain it is desired to remove.

It has been found that unless the dentures are thoroughly rinsed to remove substantially all of the salt and hypochlorite, the relatively caustic salt remaining on the dentures is apt to irritate the tissues and is very unpleasant to the touch and taste. Caustic solutions are slippery to the touch. Furthermore, the hypochlorite remaining on the denture has an unpleasant odor.

Although it is not too difficult to rinse the dentures sufficiently to remove most of the caustic and hypochlorite, it is extremely difficult to know when they have been rinsed sufficiently to wash away all of the caustic and hypochlorite or a sufficient amount so that only traces are left which are too small to produce the above-mentioned unpleasant and irritating effects.

One way of rinsing the dentures without putting the fingers into the concentrated solution is as follows: after the proper soaking interval, the receptacle containing the solution with the dentures immersed therein is placed under the faucet or tap and water is run from the tap into the container to displace the solution with clear water, whereafter the fingers can be inserted in the receptacle to remove the dentures. When this procedure is followed, it is very difficult for the user to know when the solution has been substantially completely replaced with clear water to adequately rinse the dentures and thereby prevent the above-mentioned unpleasant and irritating effects. This is a serious problem because once the consumer has had an unpleasant experience he is not apt to use the cleaner again and it is very difficult to prevent the average consumer from having such experiences.

In accordance with the present invention, an indicator for visually indicating when the denture has been sufficiently rinsed is added to the solid chlorinated trisodium phosphate and becomes dispersed throughout the solution when the water and solid composition are mixed. It visually indicates when the solution in the receptacle has been substantially completely replaced by the tap water, and consequently, when the dentures have been adequately rinsed.

Preferably, the indicator comprises a water insoluble, opacifying, finely divided, non-caking, wettable, solid material which is substantially inert with respect to the salt, the hypochlorite and the denture materials, which will not adhere to or stain the dentures, which will not reduce below about 11.0 the pH of all solutions of the solid composition down to about 750 parts per million of available chlorine and which is highly dispersable in the solution so that agitation thereof by the running tap water will disperse it through the solution to make the solution visually turbid. Consequently, after rinsing has been initiated, so long as the liquid in the receptacle is turbid, it contains finely divided material and hence hypochlorite and salt solution, and consequently, the user knows that the denture has not been adequately rinsed. When it is no longer turbid, substantially all the finely divided material and hence substantially all the solution has been washed away, and consequently, the user knows that the denture has been adequately rinsed. The term turbid included the visual effect of colored opacifying materials such as colored pigments.

Materials of a particle size which will form colloidal suspensions are considered as being water insoluble for the purposes hereof and are included.

Opacifying materials are materials which appear opaque to the type. Such materials may themselves be opaque or they may be transparent; if of different index of refraction from the water they appear opaque in a finely divided state due to light reflections from the increased and irregular surface areas. For example, glass may be transparent but when crushed fine enough will opacify water when it is suspended in the water.

The following description and the accompanying drawings will clarify the invention.

Figure 2:
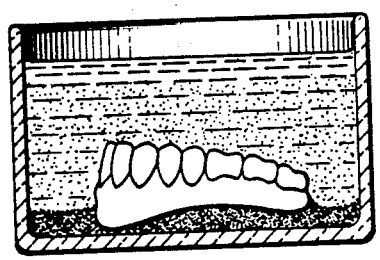
Figure 3:
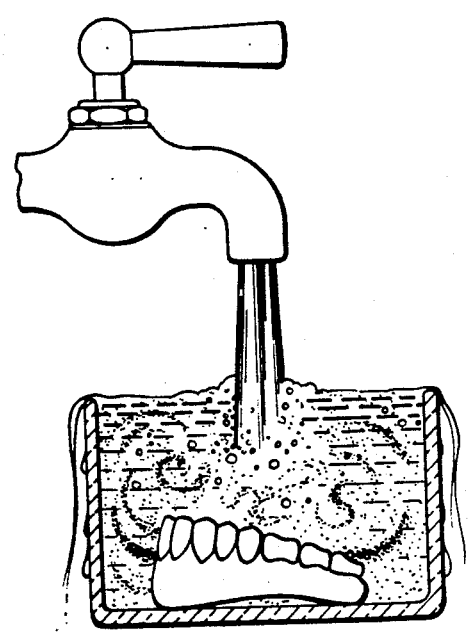

In the drawings:

FIG. 1 shows a receptacle containing water into which the solid mix of the present invention is being poured to form a cleaning solution;

FIG. 2 discloses the receptacle containing the cleaning solution with the denture immersed therein and the rinse indicator, which comprises a finely divided, inert, solid material, partially settled to the bottom of the container;

FIG. 3 discloses the container while the denture is being flushed by running tap water into the receptacle but before it has been flushed enough to displace substantially all the solution and hence to adequately rinse the denture so that the liquid in the receptacle is turbid due to the finely divided indicator dispersed therein; and FIG. 4 discloses a later stage of flushing after substantially all of the solution has been flushed out carrying with it substantially all the indicator, whereby the disappearance of the turbidity of the liquid indicates that the denture has been adequately rinsed.

The solid composition of the present invention is made by mixing the indicator with the chlorinated trisodium phosphate.

The amount of trisodium phosphate in the solid composition should preferably be equal to at least about 3.0 mols per mol of available chlorine and sufficient to maintain all solutions of the solid composition in water down to about 750 parts per million of available chlorine at a pH of at least 11.

The water-insoluble, opacifying, solid indicator material should be very finely divided. So long as the particle sizes are small enough so that the particles will be easily and widely dispersed throughout the solution to make it turbid by gentle agitation, it is sufficient. Preferably the particle size of the major portion of the particles should not be substantially greater than 1 micron. However, it is more desirable to have substantially all the particles 1 micron or less in size. Colloidal particle sizes are satisfactory.

The finely divided material must not cake or clump either in the solid composition or in the solution. Otherwise it will not become adequately dispersed throughout the solution and will render the end point at which rinsing is satisfactory difficult to observe. Furthermore, caking is undesirable because the material in some cases settles to the bottom of the receptacle while the denture is being soaked, and if it caked, the particles would not be readily dispersed by the agitation of the water subsequently flowed into the receptacle from the faucet. This is especially true where long soaking periods are used. The solid material should be readily wettable so that it will readily disperse. Indicator materials which are not readily wettable and hence readily dispersible by themselves, may be made so by the addition of suitable dispersing agents which are inert with respect to the chlorinated trisodium phosphate and denture materials. Such indicator materials together with such dispersing agents are considered dispersible materials and are included.

The indicator material should be opaque to the eye so that it will make the solution turbid. It must be substantially inert with respect to the chlorinated trisodium phosphate and the denture materials. Furthermore, it preferably should not reduce below at least 11.0 the pH of any solution of the solid composition down to 750 parts per million of available chlorine because where the dentures being cleaned contain certain metal parts conventionally used in dentures it is necessary that the pH of the solution be at least 11.0 in order to prevent metal attack.

Preferred finely divided, water insoluble, solid materials are kaolin and finely divided calcium salts such as calcium phosphate and calcium carbonate. The calcium salts may be precipitated calcium salts.

The amount of the finely divided, water insoluble materials is preferably at least about three percent by weight of the chlorinated trisodium phosphate, but it may be less provided there is an adequate amount to supply the required visual turbidity of the solution by agitation of the solution by the flow of tap water into the receptacle. A more preferable range is from five to fifteen percent by weight of chlorinated trisodium phosphate. The maximum amount of finely divided indicator is dictated only by economic considerations and by the maximum amount which can be dispersed throughout the solution.

Examples of solid compositions of the present invention are as follows:

(1) 100 grams of solid chlorinated trisodium phosphate made in accordance with the procedure described by Bell and containing about 3% to 5% by weight of hypochlorite, and fifteen grams of finely divided kaolin, the major portion of the particles of which have a particle size of one micron or less;

(2) 100 grams of solid chlorinated trisodium phosphate as in example one, and fifteen grams of precipitated calcium carbonate (particle size of one micron and less);

(3) 100 grams of solid chlorinated trisodium phosphate as in example one, and fifteen grams finely divided calcium phosphate (particle size of one micron and less).

Each of the above solid compositions was diluted with tap water by pouring the composition in a receptacle of water as shown in FIG. 1 to provide a hypochlorite solution containing about 4000 parts per million of available chlorine. Where a stronger cleaning action is required so that adequate cleaning can be achieved in a shorter time, e.g., in the doctor's office, a dilution of about 8000 parts per million or more of available chlorine can be used, and for soaking overnight, a dilution of about 1500 p.p.m. of available chlorine can be used. At dilutions as low as 750 parts per million some cleaning action is obtained but this is too dilute for reliable and dependable results. Solutions having all these dilutions were made with each of the solid compositions of the above examples. The solution in each case maintained a pH above 11 at all dilutions down to 750 parts per million of available chlorine. As set forth above, it is important to maintain a pH above 11 at dilutions down to 750 parts per million and to have at least three mols of salt per mol of available chlorine in order to prevent metal attack.

What is meant by available chlorine and 3.0 mols of salt per mol of available chlorine is described in the above-mentioned application in which it is stated that one mol of sodium hypochlorite is considered as having a mol of available chlorine so that Y mols of salt per mol of available chlorine is obtained when there are Y mols of salt per mol of sodium hypochlorite.

In each case the solid composition was stirred into the water. The liquid in the receptacle became turbid due to the dispersion of the koalin and calcium salt particles therein. Stained dentures containing nickel-chrome-cobalt clasps were then immersed in the solution for eight hours. At the end of that time, the water insoluble materials had settled to the bottom of the receptacle. FIG. 2 shows the receptacle after the first half hour when the water insoluble materials are partially settled. After eight hours, the dentures were rinsed by placing the receptacle under the tap and running tap water into it, as shown in FIG. 3. The tap water agitated the solution and caused the water insoluble rinse indicator materials to become dispersed throughout the liquid to make the liquid turbid as shown in FIG. 3. The tap water displaced the solution which was flushed out of the receptacle by overflow carrying the kaolin and calcium salts with it. Water was run into the receptacle until the turbidity disappeared as shown in FIG. 4, whereafter the dentures were removed. The dentures were substantially free of hypochlorite and trisodium phosphate salt. The stains on the dentures were removed. The metal clasps were not attacked by the hypochlorite. So long as hypochlorite and salt solution remained in the receptacle in substantial quantities during flushing, the water insoluble particles remained and were visible to make the liquid turbid. Consequently, so long as the solution remained turbid as shown in FIG. 3, it was known that there was still hypochlorite and salts present and consequently, that the rinsing was inadequate. Finally, when all the solution was substantially flushed out carrying substantially all the solids with it the liquid was no longer turbid, and it was known that the dentures had been adequately rinsed, whereupon flushing was discontinued and the dentures removed.

Figure 4:
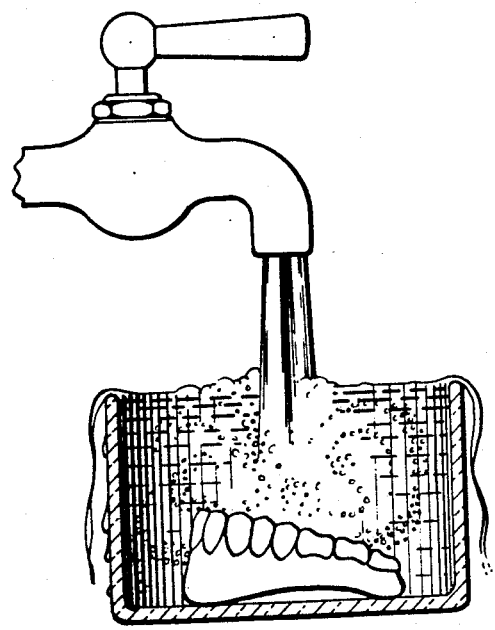

It is noted that in FIG. 4 the air bubbles in the liquid and the movement of the liquid by the tap water are readily distinguishable from the solid particles dispersed in the liquid in FIG. 3.

The solid composition is sold as such to the consumer. When he is ready to use it, he pours the recommended amount of it (recommended on the label) into a recommended amount of water with stirring the form the solution as shown in FIG. 1. The proportion of solid composition and water determines the concentration of the hypochlorite. The concentration to be used depends upon the particular speed at which cleaning is desired and the time interval during which the denture is to be soaked. At higher concentrations, the denture may be cleaned by shorter soaking times whereas with lower concentrations, longer soaking times are required.

One of the advantages of the dental cleaning solution of the above-mentioned application is its stability, and consequently, it is important that the indicator not have any harmful effect on stability.

Although the above discussion is limited to chlorinated trisodium phosphate because it is by far the most practical, and hence preferred solid hypochlorite-salt cleaning composition, mixtures of lithium hypochlorite and potassium or lithium salts of any polyvalent acid, i.e., an acid having two or more ionizable or acid hydrogen atoms, which will not act as a reducing agent to reduce and hence decompose the hypochlorite and in which all valences are taken up with alkali metal can be used. Divalent and trivalent acids are preferred. Both inorganic and organic acids are satisfactory. Examples of suitable inorganic acids are phosphoric acid, e.g. tri-postassium phosphate, sulfuric acid and carbonic acid. The organic acids are preferably aliphatic carboxylic acids such as citric acid and tartaric acid. Preferred organic carboxylic acids are those having an hydroxyl group attached to at least one of the alpha carbons. In such cases the solid rinse indicator is added to the solid hypochlorite-salt mix just as in the case of the chlorinated trisodium phosphate.

Although calcium hypochlorite can be used with the above-mentioned lithium and potassium salts, it is not entirely desirable.

The above-mentioned indicator may be added to any of the concentrated solutions described in the above-mentioned copending U.S. application Serial No. 816,402 to provide the same advantages.

The foregoing detailed description has been given for clearness of understanding only, and it is not intended that the invention be limited thereto or thereby, the invention being limited only by the appended claims and the equivalents thereof.

I claim:
1. A denture cleaner consisting essentially of a solid composition for dilution with water to form a denture cleaning solution, said composition consisting essentially of chlorinated trisodium phosphate and a rinse indicator, said rinse indicator being a water-insoluble, inert, finely divided, non-caking, solid, wettable opacifying powder which is readily dispersible in aqueous solutions of said solid composition by agitation to make said solutions turbid and which is substantially inert with respect to water, said chlorinated trisodium phosphate and denture materials, said chlorinated trisodium phosphate containing trisodium phosphate in an amount equal to at least about 3.0 mols per mol of available chlorine and sufficient to maintain aqueous solutions of said composition in water at a pH of at least 11 at all dilutions of said solid composition down to 750 parts per million of available chlorine, said indicator being one which will not reduce the pH of aqueous solutions of said solid composition below 11 at all dilutions thereof down to 750 parts per million of available chlorine, at least the major portion of said composition consisting of said chlorinated trisodium phosphate, the proportion of indicator being greater than about 3% by weight of the chlorinated trisodium phosphate.

2. An aqueous solution of the composition of claim 1, said solution containing at least 1500 parts per million of available chlorine.

3. A denture cleaner according to claim 1, said indicator being selected from the group consisting of kaolin, calcium phosphate, calcium carbonate, pigments and ground glass.

4. A denture cleaner consisting essentially of a solid composition for dilution with water to form a denture cleaning solution, said composition consisting essentially of chlorinated trisodium phosphate and a rinse indicator, said rinse indicator being a water-insoluble, inert, finely divided, non-caking, solid, wettable opacifying powder which is readily dispersible in aqueous solutions of said solid composition by agitation to make said solutions turbid and which is substantially inert with respect to water, said chlorinated trisodium phosphate and denture materials, said chlorinated trisodium phosphate containing trisodium phosphate in an amount equal to at least 3.0 mols per mol of available chlorine and sufficient to maintain aqueous solutions of said composition in water at a pH of at least 11 at all dilutions of said solid composition down to 750 parts per million of available chlorine, said indicator being one which will not reduce the pH of aqueous solutions of said solid composition below 11 at all dilutions thereof down to 750 parts per million of available chlorine, at least the major portion of said composition consisting of said chlorinated trisodium phosphate, the proportion of indicator being greater than about 3% by weight of the chlorinated trisodium phosphate said indicator being finely divided kaolin.

5. A denture cleaner according to claim 4, at least a major portion of said finely divided indicator having a particle size of one micron and finer.

References Cited in the file of this patent
UNITED STATES PATENTS

| 2,409,718 | Snell et al. | Oct. 22, 1946 |
| 2,689,225 | Anderson et al. | Sept. 14, 1954 |

FOREIGN PATENTS

| 606,431 | Great Britain | Aug. 13, 1948 |
| 739,046 | Great Britain | Oct. 26, 1955 |

OTHER REFERENCES

The Condensed Chemical Dictionary, 5th Ed., Reinhold Pub. Corp., N.Y., (1956), page 619.